(12) United States Patent
Mull

(10) Patent No.: US 6,486,680 B1
(45) Date of Patent: Nov. 26, 2002

(54) EDGE DETECTOR

(75) Inventor: Dennis Keith Mull, Concord, OH (US)

(73) Assignee: The North American Manufacturing Company, Cleveland, OH (US)

( * ) Notice: Subject to any disclaimer, the term of this patent is extended or adjusted under 35 U.S.C. 154(b) by 209 days.

(21) Appl. No.: 09/593,081

(22) Filed: Jun. 13, 2000

(51) Int. Cl.$^7$ .............................................. G01R 27/26
(52) U.S. Cl. ...................... 324/662; 324/678; 324/658; 324/686; 324/688
(58) Field of Search ................................. 324/662, 660, 324/661, 663, 671, 674, 681, 686, 688, 658

(56) References Cited

U.S. PATENT DOCUMENTS

| 3,341,774 A | * | 9/1967 | Dryben ........................ 324/663 |
| 3,764,906 A | * | 10/1973 | Heller ......................... 324/111 |
| 3,812,424 A | * | 5/1974 | Abbe .......................... 324/688 |
| 3,886,447 A | * | 5/1975 | Tanaka ........................ 324/678 |
| 4,054,833 A | * | 10/1977 | Briefer ........................ 324/679 |
| 4,058,765 A |   | 11/1977 | Richardson et al. |
| 4,158,171 A | * | 6/1979 | Abbe et al. ............. 324/661 X |
| 4,339,709 A | * | 7/1982 | Brihier ........................ 324/725 |
| 4,459,541 A |   | 7/1984 | Fielden et al. |
| 4,743,837 A | * | 5/1988 | Herzog ........................ 324/611 |
| 5,134,379 A | * | 7/1992 | Maher et al. ................ 324/663 |
| 5,166,679 A |   | 11/1992 | Vranish et al. |
| 5,294,889 A |   | 3/1994 | Heep et al. |
| 5,343,157 A | * | 8/1994 | Deschamps ................. 324/678 |
| 5,343,766 A | * | 9/1994 | Lee .......................... 73/862.61 |
| 5,394,095 A | * | 2/1995 | Kespohl ....................... 324/674 |
| 5,424,650 A | * | 6/1995 | Frick .......................... 324/688 |
| 5,612,494 A | * | 3/1997 | Shibano .................... 73/514.32 |
| 5,730,165 A | * | 3/1998 | Philipp .................... 324/677 X |
| 5,767,686 A | * | 6/1998 | Kespohl ....................... 324/662 |
| 5,769,298 A |   | 6/1998 | Plumb |
| 6,069,017 A | * | 5/2000 | Kamieniecki et al. ......... 438/17 |
| 6,257,061 B1 | * | 7/2001 | Nonoyama et al. ..... 324/661 X |
| 6,366,099 B1 | * | 4/2002 | Reddi ......................... 324/678 |

FOREIGN PATENT DOCUMENTS

| DE | 15 74 292 B 2 | 8/1978 |
| GB | 2 005 422 A | 10/1977 |

OTHER PUBLICATIONS

Capacitive Sensors and Sensing Theory Product Catalog, Gordon Products, Incorporated 10/97.

* cited by examiner

Primary Examiner—N. Le
Assistant Examiner—T. R Sundaram
(74) Attorney, Agent, or Firm—Fay, Sharpe, Fagan, Minnich & McKee

(57) ABSTRACT

A capacitance measuring circuit having a sensor electrode and a reference electrode that are spaced apart so that a material can be positioned between the two electrodes. A first polarity and a second polarity voltage source are used to charge the sensor electrode and a switch controller controls the charging and discharging of a capacitor by the sensor electrode. The charge on the capacitor after being charged and at least partially discharged by the sensor electrode represents the capacitance between the sensor electrode and the reference electrode. The charge on the capacitor is used to measure the position of the material relative to the sensor and reference electrode. The measuring circuit also has a system parasitic controller to measure and adjust for system parasitic capacitance in the measuring circuit.

87 Claims, 7 Drawing Sheets

EDGE DETECTOR

The present invention relates to a device for measuring capacitance, and more particularly to a device to detect the edge of materials, and even more particularly, to a device for the contactless detection of a moving web of material.

INCORPORATION BY REFERENCE

U.S. Pat. Nos. 5,394,095 and 5,767,686 describe and illustrate devices that detect the edge of conductive materials and control the position of the conductive materials relative to the detector of the type to which the present invention is directed. These patents are incorporated by reference herein as background information to explain certain prior edge detection and web position control arrangements of which the present invention is a specific improvement. Consequently, the details of the conductive material and the positioning of the conductive material to which the present invention is directed need not be explained in detail.

BACKGROUND OF THE INVENTION

The present invention pertains to a device to detect the capacitance between two or more electrodes as a material is positioned between the electrodes, and more particularly to an edge detector for contactless detection of the position of a moving web of conductive material and will be described with particular reference thereto; however, the invention has broader applications and can be used in any type of application which requires the accurate detection of capacitance between two or more electrodes.

Edge detectors are commonly used in conjunction with apparatus that process moving webs of material. The edge detector is used to properly align the moving web of material in the apparatus. Several types of mechanical and electronic devices have been used to detect and/or control the position of the web of material. Some of these devices are disclosed in U.S. Pat. Nos. 5,394,095 and 5,767,686. In these prior art devices, the lateral position of the web of conductive material is detected by positioning two or more detector electrodes in the area of each lateral edge of the conductive material. The capacitance between the electrodes at each lateral edge of the conductive material is measured and then used to control the lateral position of the conductive material. The lateral movement of the conductive material between the electrodes causes changes in the coupling fields between the electrodes, thereby increasing or decreasing the capacitance between the electrodes. The measured capacitance is used to determine the position of the edge of the conductive material relative to the electrodes, and such determined position is used to control the lateral position of the conductive material. The electrodes are typically shielded to isolate the electrodes from external electrical interference so as to improve the accuracy of the measured capacitance.

Although these devices satisfactorily measure the capacitance between the electrodes to determine the position of the edge of the conductive material relative to the electrodes, these devices are expensive and complex to manufacture, are very sensitive to external electrical interferences, and are unable to account for parasitic charges in the measuring circuit, which parasitic charges can adversely affect the accuracy of the edge measurement and cause undesired drift in the position control of the conductive material.

In view of the present art of capacitance measuring devices for the detection and the position control of the edge of a conductive material, there is a need for a device that accurately measures the capacitance between two or more electrodes, is less sensitive to external electrical interference, and reduces or overcomes the drift in the device.

SUMMARY OF THE INVENTION

In accordance with the present invention, there is provided a capacitance measuring circuit which is designed to measure the capacitance between a sensor electrode and a reference electrode. The capacitance measuring circuit can be used in many different types of applications where it is desired to accurately measure capacitance between two or more electrodes. The capacitance measuring circuit has particular applicability for use in detecting an edge of a conductive material, and will be particularly described with reference thereto; however, the capacitance measuring circuit can be used to measure the edge of a non-conductive material. The sensor electrode and the reference electrode of the capacitance measuring circuit are spaced apart from one another a sufficient distance so that an edge of a material can pass there between. Typically, the sensor electrode and the reference electrode are symmetrically oriented about a central axis that runs between the electrodes; however, it is not necessary that the electrode be symmetrically oriented with respect to one another. The capacitance measuring circuit includes or is designed to be connected to a first polarity voltage source and a second polarity voltage source. The first and second polarity voltage sources are used to electrically charge the sensor electrode and/or reference electrode. The capacitance measuring circuit also includes a capacitor which is used to fully or partially store a charge that is fully or partially representative of the capacitance between the sensor electrode and the reference electrode. The capacitance measuring circuit further includes a switch controller to electrically connect and/or disconnect the reference electrode, the sensor electrode, the first and second polarity voltage sources and/or the capacitor to or from one another. This sequence of operations by the switch controller to measure the capacitance between the reference electrode and sensor electrode is termed the capacitance measuring sequence. The term "electrically connected" as used in this application refers to an electrical connection that allows current and/or voltage to pass between two or more components in an electrical circuit. The term is not to be interpreted as requiring two or more components to be directly connected, thus two or more "electrically connected" components can be directly electrically connected or indirectly electrically connected. Two or more components that are indirectly electrically connected include one or more electrical elements connected between the two or more components. These electrical elements include, but are not limited to, resistors, inductors, capacitors, amplifiers, microprocessors, diodes and the like.

In accordance with one aspect of the present invention, the first polarity voltage source is a positive voltage source and the second polarity voltage source is a negative voltage source. The first polarity voltage source and the second polarity voltage source can be provided by one or more voltage sources. In one embodiment, the voltage source is a D.C. voltage source. In another embodiment, the voltage source is a rectified A.C. source. In yet another embodiment, the magnitude of the first polarity voltage source and the second polarity voltage source are generally equal. When the magnitude of the voltage sources are equal, the resulting charge on the capacitor during each measurement sequence actually or nearly represents the actual capacitance between the sensor electrode and the reference electrode. However, different magnitude voltage sources can be used. When different magnitude voltage sources are used, the charge on the capacitor during each measurement cycle will represent a relative capacitance. This relative capacitance can be used to control the position of the material or be converted to an actual capacitance prior to being used to control the positioning of the material.

In accordance with another aspect of the present invention, the conductive material is a web of material having a generally constant width and two lateral edges. At least one of the lateral edges of the material is oriented to be at least partially positioned between the sensor electrode and reference electrode. The material is made of a material to cause an interference in the electrical field between the sensor electrode and the reference electrode when a voltage is applied to the sensor and/or reference electrode. This interference in the electrical field alters the capacitance between the sensor electrode and reference electrode. As a result, the measured capacitance between the sensor electrode and reference electrode is representative of the position of the edge of the material relative to the sensor and/or reference electrode. Therefore, the position of the material can be controlled by the detected capacitance. The type of material used is not critical. The material may be a conductive or non-conductive material. The material needs only to alter the capacitance between the reference and the sensor electrode.

In accordance with still another aspect of the present invention, the switch controller causes the capacitor in the capacitance measuring circuit to be charged and at least partially discharged during a capacitance measuring sequence so that the remaining charge on the capacitor represents the capacitance between the sensor electrode and the reference electrode. The switch controller causes a special sequence of electrical connections and disconnections to occur in the circuit thereby causing the charge on the capacitor to represent the capacitance between the reference and sensor electrode. In one embodiment, the switch controller causes the capacitor to be charged by a first polarity voltage on the sensor electrode which voltage constitutes a voltage between the universe and the sensor electrode, and to be discharged by a second polarity voltage that is similar on the sensor and reference electrode. In accordance with one aspect of this embodiment, the switch controller resets the capacitance measuring circuit after one or more capacitance measuring sequences. Typically, the capacitance measuring circuit is reset by grounding and/or draining the charge from the capacitor so the capacitor's charge is substantially zero. In another aspect of this embodiment, the switch controller, at the beginning of the capacitance measuring sequence, electrically isolates the capacitor from the sensor electrode and reference electrode. The switch controller, simultaneously or subsequently isolates the sensor electrode from the reference electrode and grounds the reference electrode. As a result, the capacitor, the reference electrode and the sensor electrode are isolated from one another. Once these components have been isolated, the switch controller electrically connects the sensor electrode to the first polarity voltage source. The first polarity source charges the sensor electrode to substantially the same voltage or potential as the first polarity voltage source. During this charging sequence, the reference electrode is grounded and the capacitor is maintained in electrical isolation from the reference and sensor electrode. After the sensor electrode is charged, the switch controller electrically disconnects the sensor electrode from the first polarity voltage source. At this point of the capacitance measuring sequence, the reference electrode and the material are grounded and the sensor electrode is charged to substantially the same voltage or potential as the first polarity voltage source. The capacitance measuring sequence is continued by the switch controller electrically connecting the sensor electrode to the capacitor so that the charge on the sensor electrode is transferred to the capacitor. Once the charge from the sensor electrode is transferred to the capacitor, the switch controller electrically disconnects the sensor electrode from the capacitor. The switch controller then causes the reference electrode to have a potential or voltage that is at least substantially equal to the potential or voltage on the sensor electrode and disconnects the reference electrode from the grounded state. The connection formed at the reference electrode causes the potential on the reference electrode to follow the potential on the sensor electrode. The switch controller then connects the opposite polarity voltage source to the sensor electrode. The sensor electrode is then charged to the voltage or potential of the opposite polarity voltage source. The potential on the reference electrode follows the potential on the sensor electrode. Once the sensor electrode has been charged by the opposite polarity voltage source, the switch controller disconnects the opposite polarity voltage source from the sensor electrode. The capacitance measuring sequence is continued by the switch controller electrically connecting the sensor electrode to the capacitor. The charge on the sensor electrode is then transferred to the capacitor. Since the polarity of the voltage on the sensor electrode is opposite the polarity of the voltage previously supplied by the sensor electrode, the capacitor is fully or partially discharged as the charge on the sensor electrode is transferred to the capacitor. The remaining charge on the capacitor after a single capacitance measuring sequence represents the capacitance between the reference electrode and the sensor electrode. As can be appreciated, if the material is completely obscuring the reference electrode and the sensor electrode, the resulting charge on the capacitor after a single capacitance measuring sequence is substantially zero. Furthermore, the resulting charge on the capacitor will be smallest when the material is fully positioned between the reference electrode and sensor electrode. Consequently, the further the edge of the material moves between the reference electrode and the sensor electrode, the smaller the resulting charge on the capacitor after each capacitance measuring sequence. This charging and discharging of the capacitor has been found to accurately measure the capacitance between the reference electrode and the sensor electrode when a material is at least partially positioned there between. In another embodiment, each capacitance measuring sequence is less than about one second. Typically, the faster the capacitance measuring sequence, the better the position control of the material. In one aspect of this embodiment, each capacitance measuring sequence is much less than one second, and preferably about 10 $\mu$s ($10^{-5}$ second).

In accordance with still yet another aspect of the present invention, the charge on the capacitor is integrated over a series of capacitance measuring sequences so as to obtain an average charge on the capacitor over a series of capacitance measuring sequences. In one embodiment, the capacitor is included in an integrator circuit wherein the charge on the capacitor is accumulated over a series of capacitance measuring sequences prior to being drained or discharged. In one aspect of this embodiment, a charge detector detects the charge on the capacitor and monitors the number of capacitance measuring sequences which have transpired. The charge detector measures the accumulated charge on the capacitor and divides the detected charge by the number of capacitance measuring sequences to obtain the average capacitance between the reference electrode and the sensor electrode. After the charge on the capacitor has been integrated over a number of capacitance measuring sequences, the capacitor is drained or discharged so as to reset the charge of the capacitor to zero to begin the recharging of the capacitor by one or more capacitance measurement sequences. In another aspect of this embodiment, the charge detected by the charge detector is converted from an analog signal to a digital signal. The conversion of the signal from analog to digital facilitates in the subsequent mathematical manipulation of the signal. For instance, the digital signal can be used in a microprocessor and/or other digital circuit to control the lateral position of the conductive material, used for calibration purposes, used to zero-out the values in the circuit, etc. As can be appreciated, the conversion of the signal from an analog to a digital signal is not required for the operation of the circuit. In still another aspect of this embodiment, the capacitor has a rated capacitance which is greater than the measured capacitance between the sensor electrode and reference electrode. Typically, the capacitance rating of the capacitor is at least about five times greater than the capacitance between the reference electrode and the sensor electrode, preferably at least about ten times greater than the capacitance between the reference electrode and the sensor electrode, and more preferably about 50-300 times the capacitance between the reference electrode and the sensor electrode. The large capacitance rating on the capacitor relative to the measured capacitance between the reference electrode and the sensor electrode ensures that an accurate capacitance reading is obtained. Furthermore, the large capacitor rating allows the charge on the capacitor to be integrated over a number of capacitance measuring sequences without fully charging the capacitor.

In a further aspect of the present invention, the sensor electrode and/or the reference electrode are shielded so as to reduce external electrical interferences on the electrodes when measuring the capacitance between the reference electrode and the sensor electrode. In one embodiment, the sensor electrode is shielded. Shielding of the reference electrode is not required to obtain accurate capacitance readings. In one aspect of this embodiment, the shielding arrangement for the sensor electrode is similar to that disclosed in Kespohl U.S. Pat. No. 5,767,68. In another embodiment, the reference electrode and the sensor electrode are shielded. When large voltages are applied to the sensor electrode and the reference electrode and/or when very accurate capacitance readings are required, the reference electrode and the sensor electrode are typically shielded. In one aspect of this embodiment, the shielding arrangement for the reference electrode and sensor electrode is similar to that disclosed in Kespohl U.S. Pat. No. 5,767, 686.

In accordance with yet a further aspect of the present invention, the capacitance measuring circuit includes a system parasitic controller to compensate for the parasitic charge which develops in the capacitance measuring circuit. During the operation of the capacitance measuring circuit, a residual or parasitic charge can develop from one or more components of the capacitance measuring circuit. This residual or parasitic charge can exist even after one or more of the components of the capacitance measuring circuit have been reset and/or grounded. However, this residual or parasitic charge is most prevalent when the charge on the capacitor is being integrated over multiple capacitance measuring sequences. This residual or parasitic charge can result in variances in the measured charged during one or more capacitance measuring sequences. As a result, the parasitic charge can result in drift in the position control mechanism for the material and/or cause an unstable position control system for the material. The parasitic charge also can cause inaccurate position information of the material relative to the reference electrode and sensor electrode. The system parasitic controller is designed to periodically measure the parasitic charge in the capacitance measuring circuit. In one embodiment, the system parasitic controller measures the parasitic charge after each capacitance measuring sequence. In another embodiment, the system parasitic controller measures the parasitic charge after a plurality of capacitance measuring sequences. In one aspect of this embodiment, the system parasitic controller measures the parasitic charge at least once every minute, and preferably at least once every 30 seconds, and more preferably at least once every 10 seconds. In yet another embodiment, the system parasitic controller integrates the measured parasitic charge over a plurality of system parasitic controller measuring sequences. In still another embodiment, the system parasitic controller adjusts the measured charges on the capacitor with the measured parasitic charge so as to reduce or eliminate the effects of the parasitic charge from the measured charges on the capacitor. In one aspect of this embodiment, the measured parasitic charge is subtracted from the measured charge on the capacitor. In still yet another embodiment, the measured parasitic charge is converted from an analog signal to a digital signal so that the measured parasitic charge can be accounted for by a microprocessor or other type of digitally based circuit. As can be appreciated, the analog signal can be used without conversion to a digital signal. In a further embodiment, the system parasitic controller causes the switch controller to alter the electrical connection and disconnection sequence during the capacitance measuring sequence so as to detect the parasitic charge in the capacitance measuring circuit. In one aspect of this embodiment, the system parasitic controller causes the switch controller to disconnect the reference electrode from the ground and to cause the reference electrode to at least substantially follow the potential on the sensor electrode throughout the capacitance measuring sequence. Since the voltage or potential on the reference electrode is at least substantially identical to the voltage or potential on the sensor electrode, the potential on the reference electrode always follows the potential on the sensor electrode during the capacitance measuring sequence. As a result, any charge on the capacitor after the capacitance measuring sequence is completed represents the parasitic charge in the capacitance measuring circuit. In another aspect of this embodiment, the system parasitic controller causes the switch controller to ground the reference electrode throughout the capacitance measurement sequence. Since the reference electrode is always in a grounded state throughout the capacitance measuring sequence, the charge on the capacitor after the capacitance measurement sequence is completed represents the parasitic charge in the capacitance measuring circuit.

In still yet a further aspect of the present invention, a capacitance measuring circuit is positioned at each lateral edge of the material so as to measure the capacitance at each edge of the material. The measured capacitance from the two capacitance measuring circuits is used by a position controller to properly control the lateral position of the material. In one embodiment, the position controller is a comparison circuit or microprocessor which compares the two capacitances from the capacitance measuring circuit to adjust the lateral position of the material. In another embodiment, the electrodes of each capacitance measuring circuit are symmetrically positioned relative to the material so that the measured capacitance of each capacitance measuring circuit is generally the same when the material is in the proper lateral position. In one aspect of this embodiment, the position controller compares the measured capacitance of each capacitance measuring circuit and sends a signal to a lateral material positioner to cause the material to move laterally so as to cause the measured capacitance of each capacitance measuring circuit to be equal.

It is the primary object of the present invention to accurately measure the capacitance between a reference electrode and a sensor electrode when a material is at least partially positioned there between.

It is another object of the present invention to provide a capacitance measuring circuit which is simple and easy to operate.

It is yet another aspect of the present invention to provide a capacitance measuring circuit which charges and partially discharges a capacitor to obtain the capacitance between a reference electrode and a sensor electrode.

It is still another object of the present invention to provide a capacitance measuring circuit which includes an integrator circuit to integrate the charge on a capacitor over a series of capacitance measurement sequences.

It is a further object of the present invention to provide a capacitance measuring circuit which is used to detect the position of a material relative to a sensor electrode and a reference electrode.

It is still a further object of the present invention to provide a capacitance measuring circuit which is used in conjunction with another capacitance measuring circuit to detect the position of a material.

It is still yet a further object of the present invention to provide a capacitance measuring circuit which is used in conjunction with another capacitance measuring circuit to generate signals which control the position of the material.

It is another object of the present invention to provide a capacitance measuring circuit which detects the parasitic charge in one or more components of the capacitance measuring circuit.

It is yet another object of the present invention to provide a capacitance measuring circuit which compensates for the parasitic charge in the capacitance measuring circuit when measuring the capacitance between a reference electrode and a sensor electrode.

It is still yet another object of the present invention to provide a capacitance measuring circuit which shields a sensor electrode and/or a reference electrode from external electrical interference when measuring the capacitance between the electrodes.

These and other objects and advantages will become apparent to those skilled in the art upon reading and following this description taken together with the accompanied drawings.

BRIEF DESCRIPTION OF THE DRAWINGS

Reference may now be made to the drawings, which illustrate various embodiments that the invention may take in physical form and in certain parts and arrangements of parts wherein.

DETAILED DESCRIPTION OF THE PREFERRED EMBODIMENTS

Figure 1:
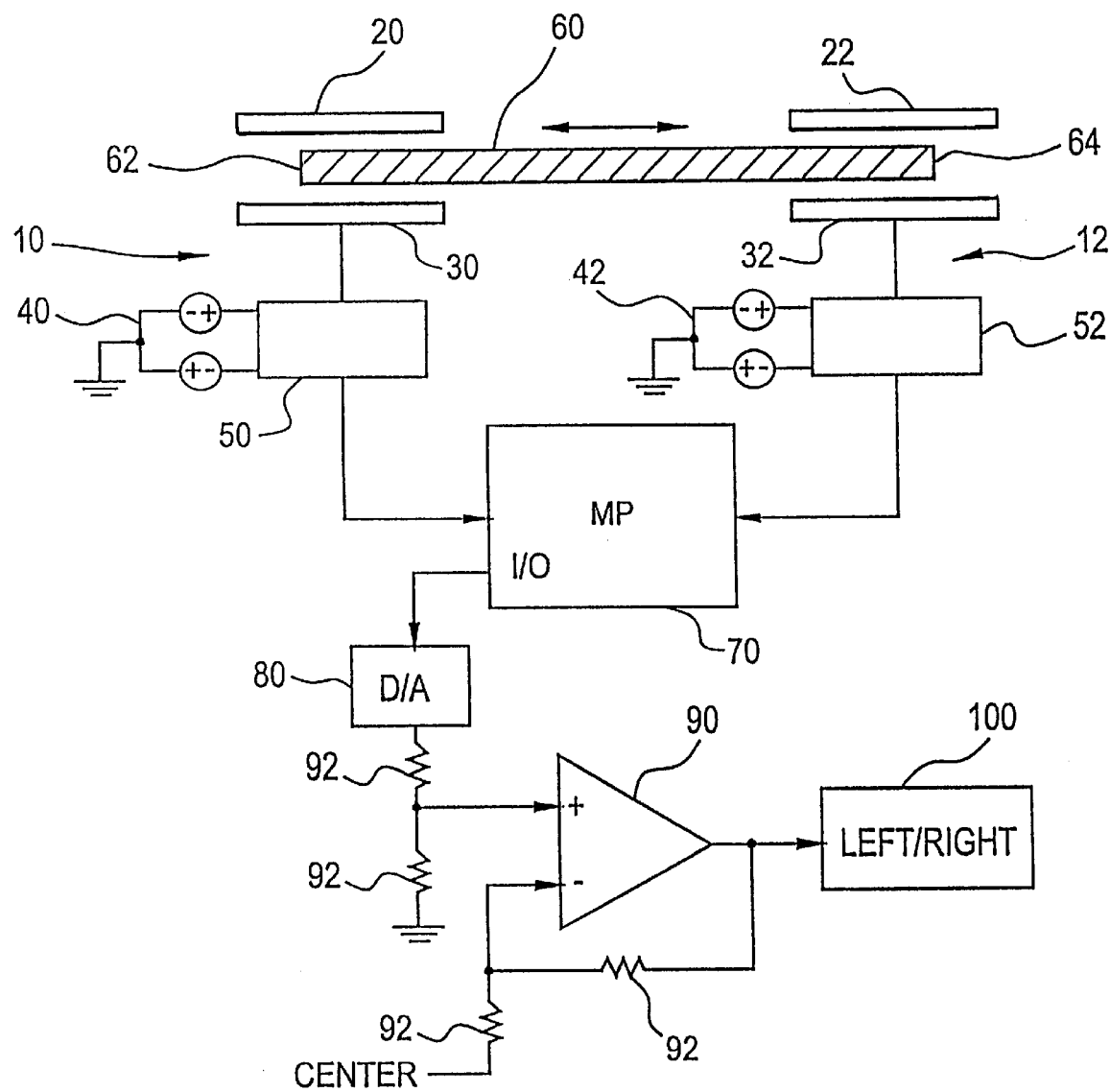
FIG. 1 is a diagrammatic, partial sectional view of a pair of capacitance measuring circuits positioned at each lateral edge of a material and connected to a controller to control the lateral position of the material relative to the electrodes of the two capacitance measuring circuits.

Referring now to the drawings wherein the showings are for the purpose of illustrating the preferred embodiments of the invention only and not for the purpose of limiting the same, FIG. 1 illustrates the arrangement of two capacitance measuring circuits 10, 12 relative to a moving web or grounded strip of material 60. Material 60 is a conductive material and will be described with particular reference thereto; however, material 60 can be a non-conductive material. The web of conductive material 60 is shown in cross-section and moves into and out of the plane of projection. Each of the capacitance measuring circuits include a reference electrode 20, 22 and a sensor electrode 30, 32. The reference electrode and sensor electrode of capacitance measuring circuit are spaced apart a sufficient distance such that lateral edges 62, 64 of conductive material 60 are positioned at least partially between the reference electrode and sensor electrode of the capacitance measuring circuit. As shown in FIG. 1, the conductive material 60 does not contact either the reference electrode 20, 22 or the sensor electrode 30,32 as the web of conductive material 60 moves into or out of the plane of projection. Each of the capacitance measuring circuits 10, 12 include a voltage source 40, 42 which provide a positive and negative voltage source to switch controller 50, 52. As will be described in more detail below, the switch controller causes the components of the capacitance measuring circuit to be electrically connected and/or disconnected from one another in a certain sequence so that the capacitance between the reference electrode and the sensor electrode of each capacitance measuring circuit is detected.

The detected capacitance of each capacitance measuring circuit is converted into a signal, typically a digital signal, and directed to a microprocessor 70 which compares the detected capacitance to one another and/or to a set point and then generates a digital output signal. The digital output signal is then optionally converted by a digital/analog converter 80 to an analog control signal. This analog control signal is directed to operational amplifier 90. As can be appreciated, an analog signal can be used throughout the operation of the circuit. The other input to operational amplifier 90 is a center set point. The center signal can be set manually or set by a microcontroller, such as microprocessor 70. Operational amplifier 90 includes several resistors 92 to limit the gain of the amplifier. The analog control signal and the center set point are converted by the operational amplifier into a signal which is sent to a lateral position controller 100 which causes the conductive material 60 to move left or right, as shown by the arrows, in view of the control signal received from the operational amplifier. The use of a microprocessor to control the lateral position of a web of conductive material is well known in the art, thus will not be described in detail herein. As can be appreciated, the microprocessor can include a variety of variables to interpret the signal from the capacitance control circuits. Such information can include, but is not limited to, material type, material width, material thickness, material speed, the type of electrodes used in the capacitance control circuits, the magnitude of the voltage sources applied to the electrodes, and/or the shielding of the electrodes. One or more of these variables can be used to modify the signal from the capacitance control circuits to produce a position control signal. As also can be appreciated, the microprocessor can directly control the lateral movement of the conductive material without any modification of the control signal.

Figure 2:
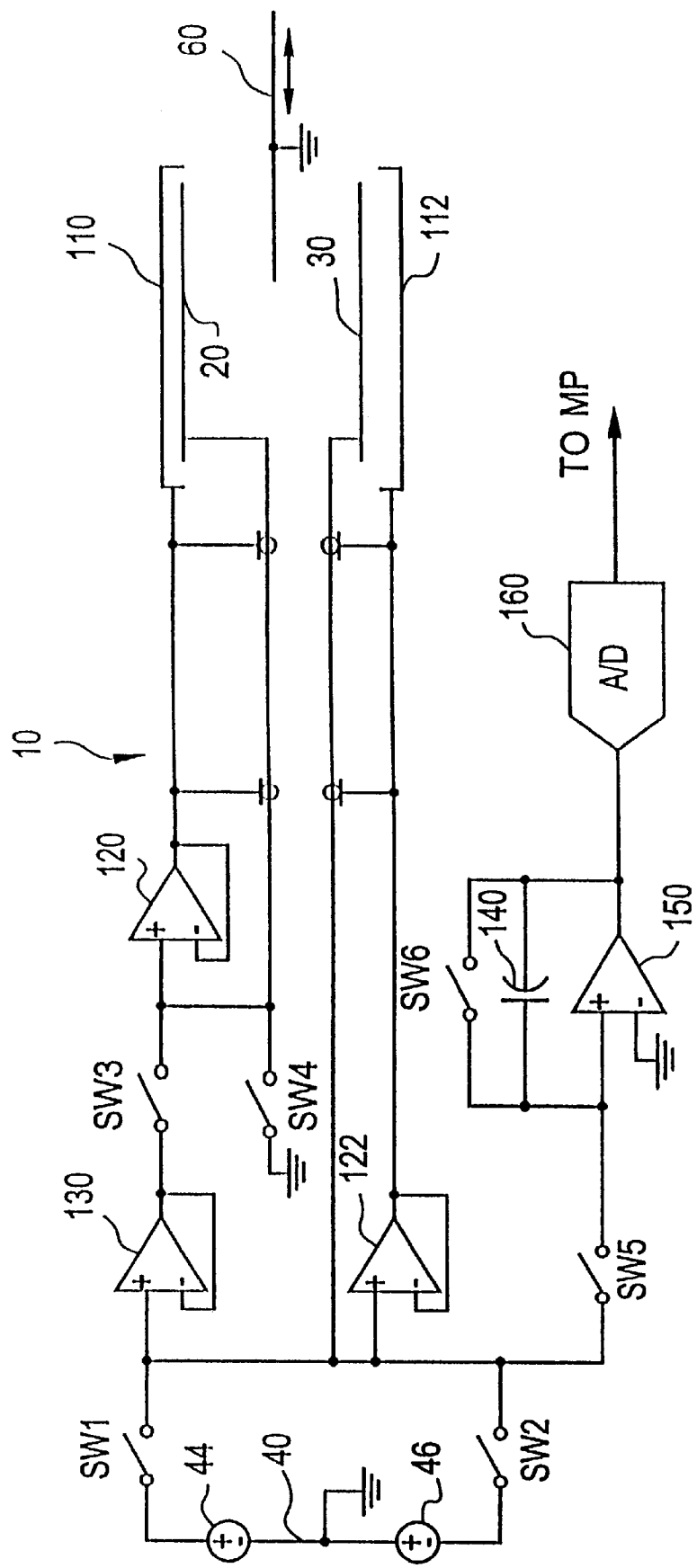
FIG. 2 is a diagrammatic view of a single capacitance measuring circuit.

Referring now to FIG. 2, capacitance measuring circuit 10 is illustrated. Capacitance measuring circuit 12 has a similar configuration. Capacitance measuring circuit 10 includes a reference electrode 20 and a sensor electrode 30 which are spaced apart from one another and are positioned essentially symmetrically about a central axis. Conductive material 60 is shown to be grounded and aligned substantially in the central axis between reference electrode 20 and sensor electrode 30. Reference electrode 20 is shielded by shielding electrode 110 and shielding amplifier 120. Sensor electrode 30 is also shown to be shielded by shielding electrode 112 and shielding amplifier 122. The shielding electrodes and shielding amplifiers shield the reference electrode and sensor electrode from external electrical signals or electrical interferences which can alter the capacitance between the reference electrode and sensor electrode. Typically, the gain on the shielding amplifiers is about 1 so as to ensure that the voltages or potentials of the shielding electrodes match the voltages or potentials of the corresponding reference electrode and sensor electrode.

A voltage source 40 is illustrated as having a positive polarity voltage source 44 and a negative polarity voltage source 46. The magnitude of the positive polarity voltage and the negative polarity voltage are substantially the same. As can be appreciated, the magnitude of the positive and negative voltage source can be different. The voltage source is typically a D.C. voltage source or a rectified A.C. voltage source.

The capacitance measuring circuit 10 also includes a capacitor 140 and an integration amplifier 150. Connected to the output of capacitor 140 is an analog digital converter 160 which converts the detected charge on capacitor 140 from an analog signal to a digital signal for further processing by the position control system of the conductive material, such as microprocessor 70.

Figure 3:
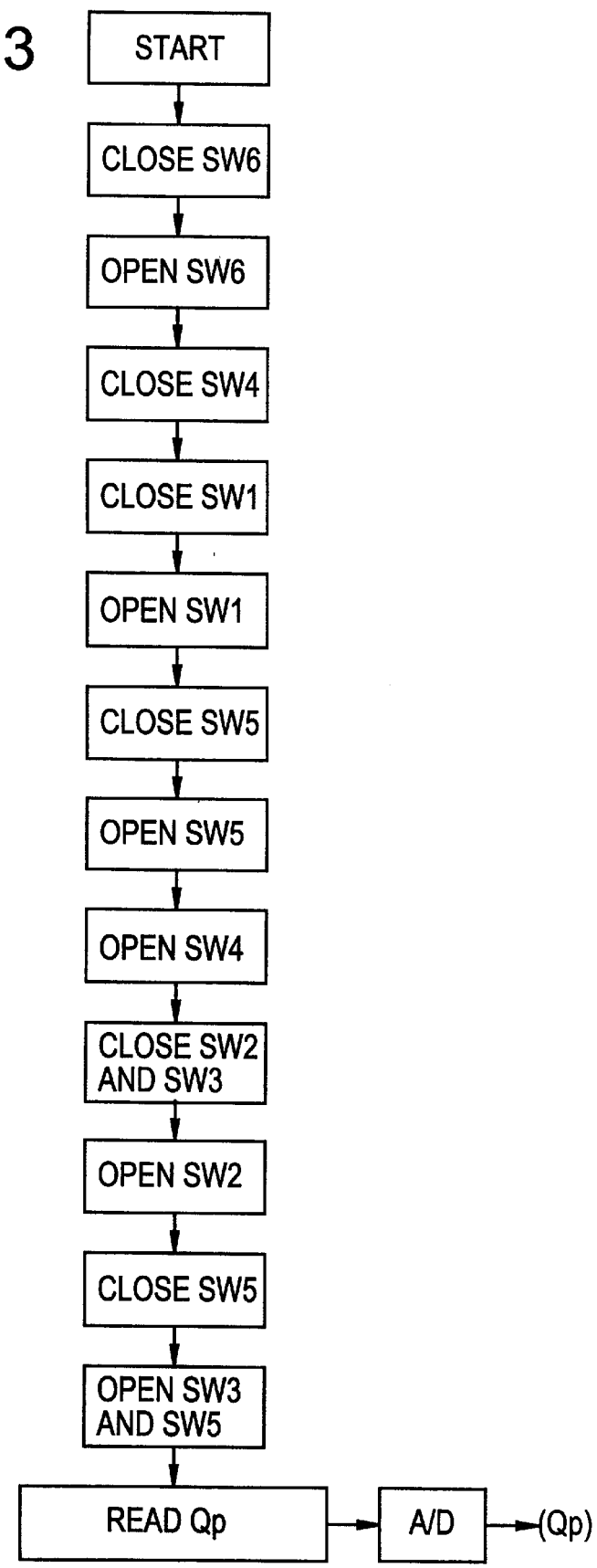
FIG. 3 is a flow chart illustrating the operation of the capacitance measuring sequence of a capacitance measuring circuit.

Referring now to FIG. 3, the sequence of operation of the switches in the capacitance measuring circuit for measuring the capacitance between the reference electrode and sensor electrode (i.e. capacitance measuring sequence) is set forth. At the beginning of the capacitance measuring sequence, switch 6 in the integration circuit is closed so as to drain or discharge the charge on capacitor 140. After the charge on capacitor 140 is discharged to substantially zero, switch 6 is opened. Switch 4 is then closed so as to ground reference electrode 20. After reference electrode 20 is grounded, switch 1 is closed so as to allow positive polarity voltage source 44 to charge sensor electrode 30. After sensor electrode 30 has been charged to substantially the same voltage or potential as positive polarity voltage source 44, switch 1 is opened to disconnect the positive polarity voltage source from sensor electrode 30. Switch 5 is then closed so that the charge on sensor electrode 30 is discharged onto capacitor 140. After the charge on sensor electrode 30 has been transferred to capacitor 140, switch 5 is opened. Switch 4 is then opened so as to disconnect reference electrode 20 from a ground condition. After switch 4 is opened, switches 2 and 3 are closed. The closing of switch 3 causes the potential of reference electrode 20 to follow the potential on sensor electrode 30. The closing of switch 2 causes negative polarity voltage source 46 to charge sensor electrode 30. Since the potential on reference electrode 20 is substantially identical to the potential on sensor electrode 30, the potential on reference electrode 20 follows the potential on sensor electrode 30. Buffer amplifier 130, as shown in FIG. 2, allows the potential on reference electrode 20 to be substantially equal to the potential on sensor electrode 30 without being directly electrically connected together. Once sensor electrode 30 has been charged by negative polarity voltage source 46, switch 2 is opened. After switch 2 is opened, switch 5 is closed so that the charge on sensor electrode 30 is transferred to capacitor 140. Since the polarity of the potential on reference electrode 20 and sensor electrode 30 is opposite the charge previously placed upon capacitor 140, the reverse polarity potential from sensor electrode 30 causes the charge on capacitor 140 to be at least partially discharged. The remaining charge on capacitor 140 after reference electrode 20 and sensor electrode 30 have been discharged is representative of the capacitance between reference electrode 20 and sensor electrode 30.

The mathematical representation of the resulting charge on capacitor 140 after the capacitor has been charged and partially discharged is $(Q_\infty - (Q_\infty - Q_p))$. $Q_\infty$ represents the positive polarity potential on sensor electrode 30 when reference electrode 20 and conductive material 60 are grounded. $-(Q_\infty - Q_p)$ is the charge between sensor electrode 30 when reference electrode 20 and sensor electrode 30 are charged by negative polarity voltage source 46. The negative notation on $Q_\infty$ represents the negative polarity condition. $Q_p$ represents the resulting charge on capacitor 140 between reference electrode 20 and sensor electrode 30 after each measuring sequence. As illustrated in the mathematical formula, when these two charges are added together on capacitor 140, the resulting charge $Q_p$ is representative of the capacitance between sensor electrode 30 and reference electrode 20. As shown in FIG. 3, the charge on capacitor 140 is detected and the analog signal is optionally converted to a digital signal for further processing.

Figure 4:
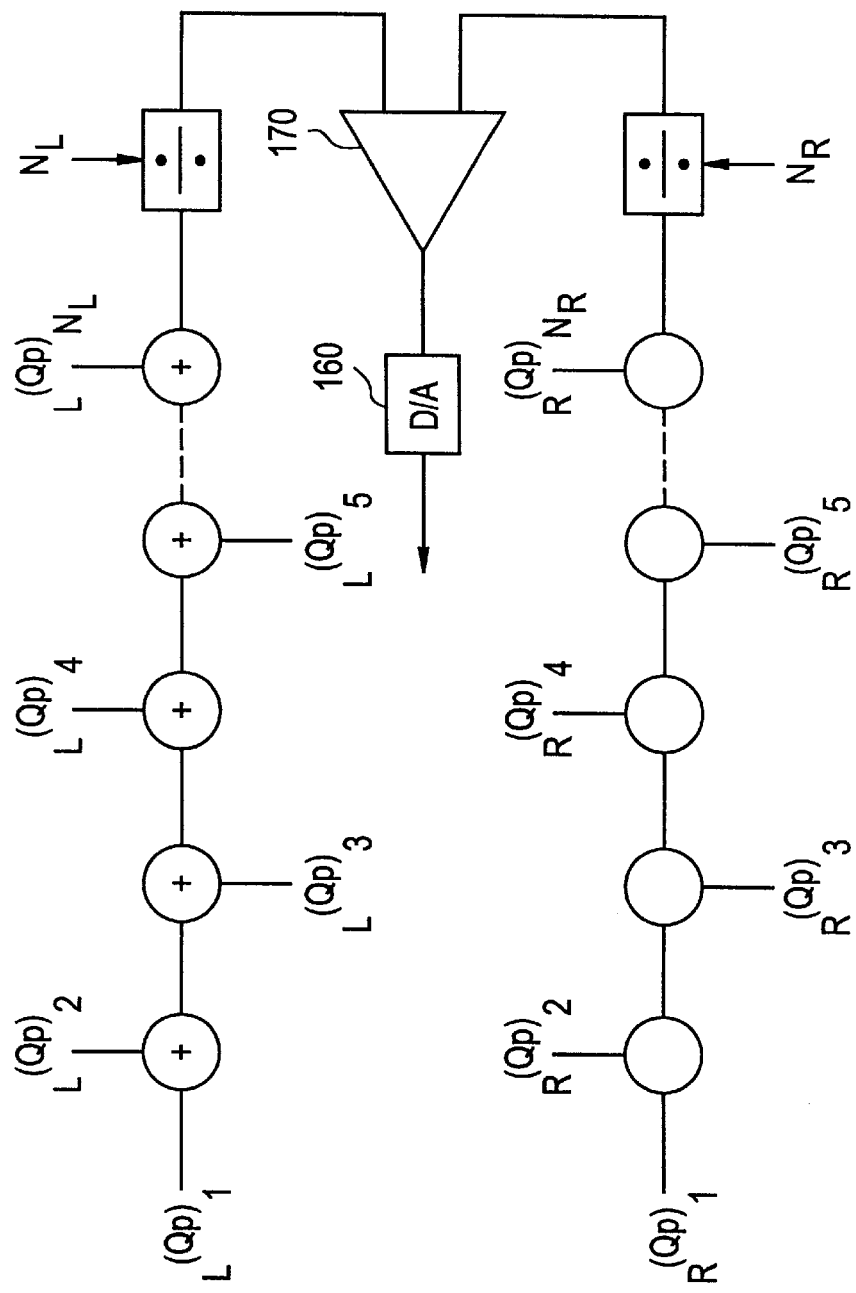
FIG. 4 is a diagrammatic illustration of the integration of the charge on the capacitor of two capacitance measuring circuits.

Referring now to FIG. 4, the integration of the charge Q on capacitor 140 over a plurality of capacitance measuring sequences is illustrated. As shown in FIG. 4, the resulting charge $Q_p$ on capacitor 140 of left capacitance measuring circuit 10 is added together over an N number of capacitance measuring sequences. The sum of the charge on capacitor 140 is then divided by N to obtain the average charge over N number of capacitance measuring sequences. A similar operation is conducted on right capacitor measuring circuit 12. The measured charge from the left and right capacitance measuring circuit is directed to a control circuit 170 which produces an analog control signal which in turn is converted by an analog digital converter 160 to a digital control signal.

Figure 5:
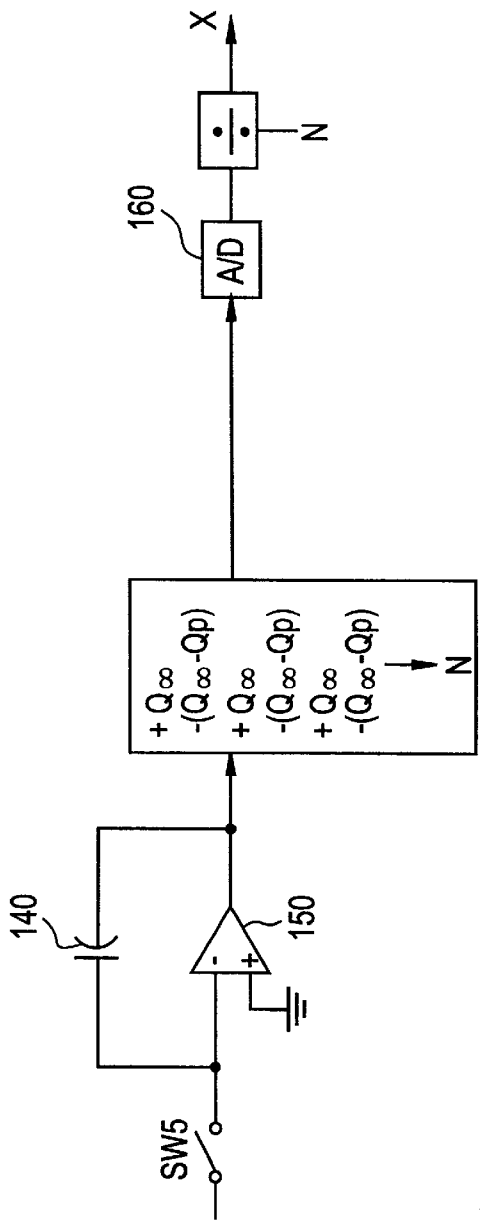
FIG. 5 is a diagrammatic and schematic view of the integration circuit integrating the charge on the capacitor of a capacitance measuring circuit.
Figure 6:
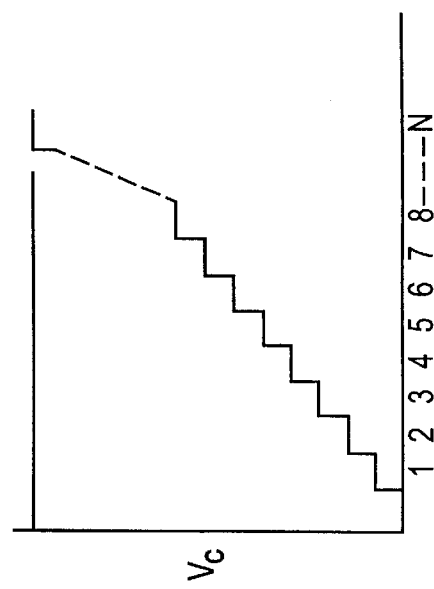
FIG. 6 is a graphical representation of the charge on the capacitor during the integration of the charge on the capacitor.

Referring now to FIGS. 5 and 6, the integration of the charge on capacitor 140 over a plurality of capacitance measuring sequences is shown illustratively and graphically. Referring to FIG. 5. Cap (140) and op amp (150) together form an integrating amplifier. Together, they serve to accumulate charge and its output voltage is a direct indication of the magnitude of that charge. ($V_C=NQ_p/C$). $NQ_p$ is the accumulated charge on capacitor 140. N is the number of capacitance measuring sequences. $V_c$ is the integrator output voltage. C is the capacitance of capacitor 140. $V_c$ is converted to a digital signal by analog digital converter 160. The digital signal is then divided by the number of capacitance measuring sequences N that produced the read charge. The resulting charge Q is the average charge generated by each capacitance measuring sequence. Charge Q is representative of the capacitance between reference electrode 20 and sensor electrode 30. FIG. 6 graphically illustrates the accumulated charge on capacitor 140 after each capacitance measuring sequence.

Figure 7:
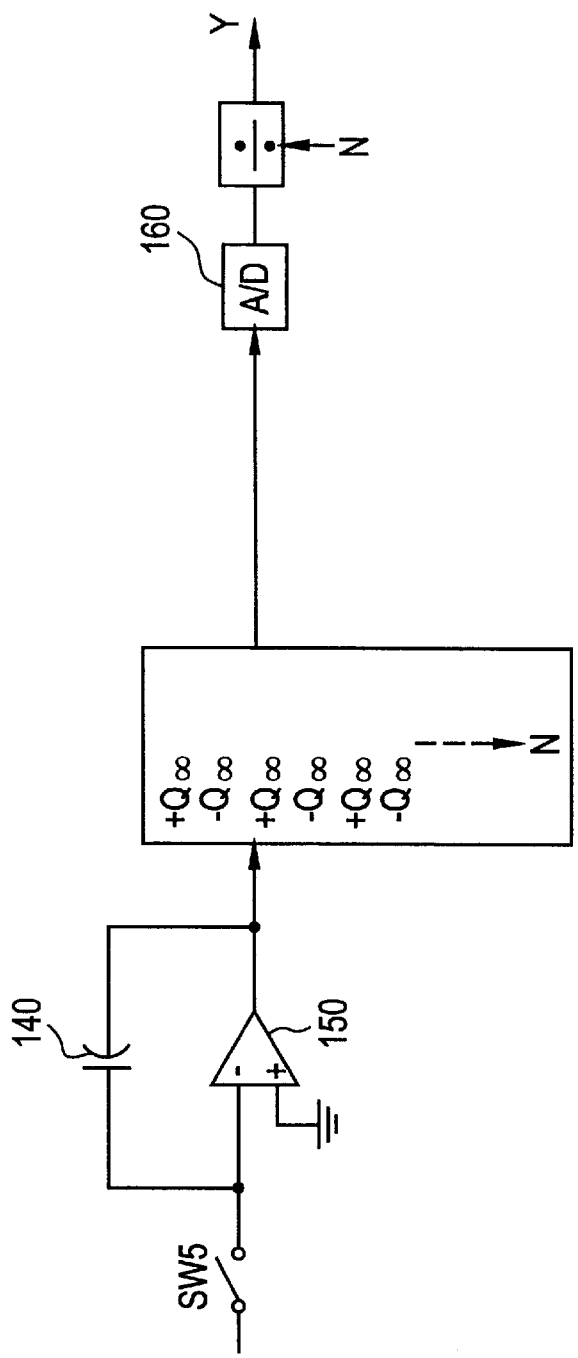
FIG. 7 is a diagrammatic and schematic view of the integration circuit integrating the parasitic charge on capacitor of a capacitance measuring circuit.
Figure 8:
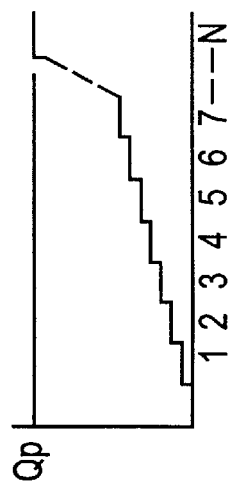
FIG. 8 is a graphical representation of the parasitic charge on the capacitor during the integration of the parasitic charge on the capacitor.
Figure 9:
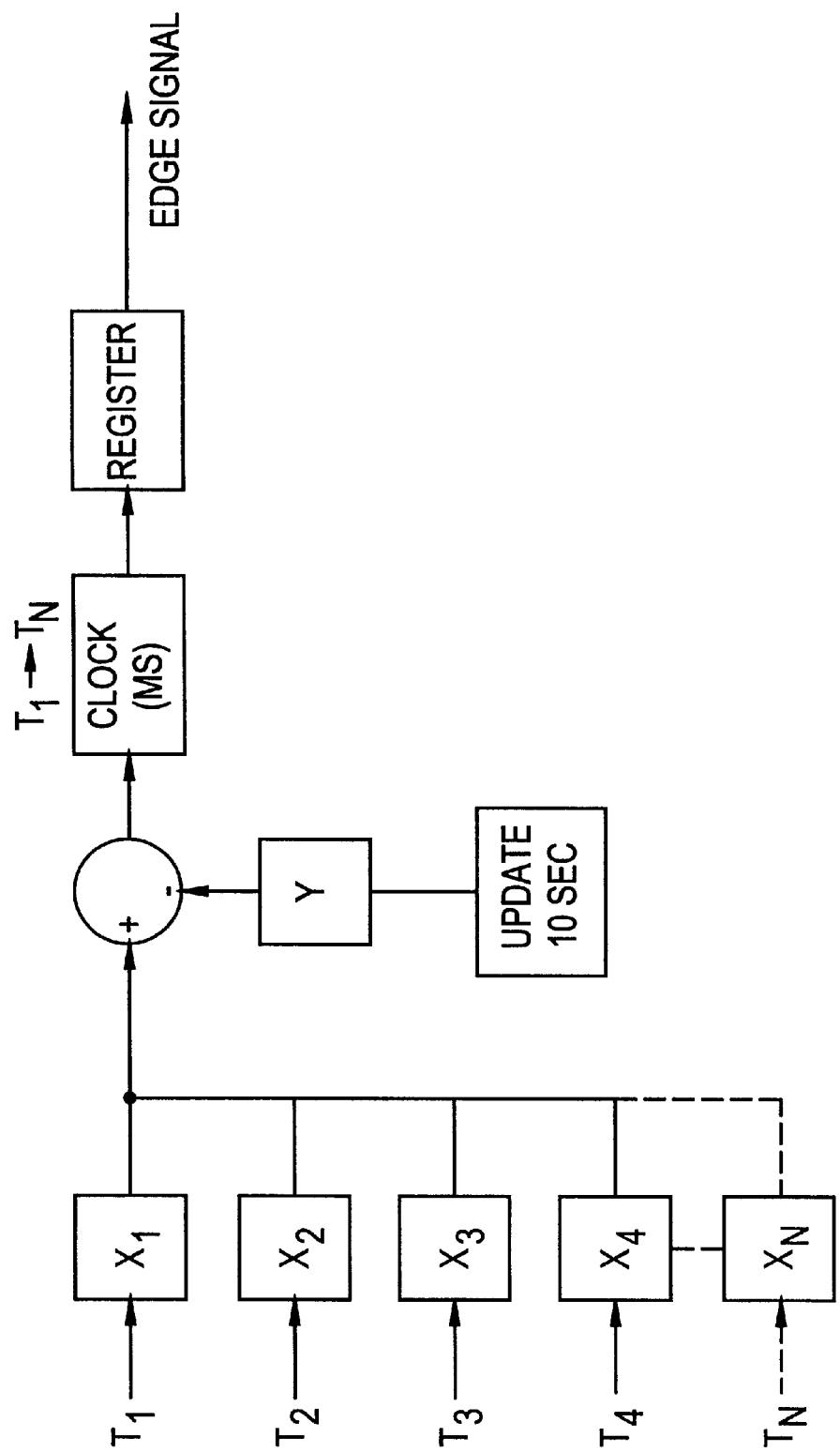
FIG. 9 is a diagrammatic view of the measured charge on the capacitor being periodically adjusted for the parasitic charge in the capacitance measuring circuit prior to the measured charge being used to control the position of the material.

Referring now to FIGS. 7–9, the measurement and adjustment of the parasitic charge on the capacitance measuring circuit is illustrated. Each capacitance measuring circuit includes a parasitic controller to measure the parasitic charge in the capacitance measuring circuit. The parasitic charge is a residual charge which exists in the capacitance measuring circuit causing inaccurate charge values on the capacitor after each capacitance measuring sequence. When the charge on the capacitor is integrated over a large number of capacitance measuring sequences, the parasitic charge correspondingly accumulates, thereby causing inaccurate readings thus causing charge reading which deviate from the actual charge which should have been generated during each capacitance control sequence.

The parasitic charge on the capacitance measuring circuit can be measured by two different methods. In both methods, the capacitance measuring sequence is activated and the parasitic switch controller modifies the sequence of opening and closing the switches in the capacitance measuring circuit. In one method of measuring, the parasitic switch controller causes reference plate 220 to be grounded throughout the capacitance measuring sequence. Therefore, the parasitic switch controller causes switch 3 to remain open and switch 4 to remain closed throughout the capacitance measuring sequence. In this arrangement, sensor electrode 30 when it is charged by positive polarity and negative polarity voltage source 44,46 respectively, is always viewing conductive material 60 and reference electrode 20 in the grounded state. Therefore, after capacitor 140 has been charged and at least partially discharged by the charge on sensor electrode 30 during the capacitance measuring sequence, the resulting charge should be zero if no parasitic charge in capacitance measuring circuit exists. However, if a remaining charge on capacitor 140 exists, this remaining charge represents the parasitic charge presently on the capacitance measuring circuit. This sequence of measuring the parasitic charge is illustrated in FIG. 7. FIG. 7 illustrates that a plurality of measurements for the parasitic charge on the capacitance measuring circuit are executed and are read by an analog digital converter 160 to a digital signal, which signal is divided by the number of parasitic measurement cycles N to produce the read parasitic charge on the capacitance measuring circuit, which parasitic charge is represented by Y. FIG. 8 illustrates the accumulated parasitic charge on capacitor 140 as a plurality of parasitic measurement sequences are executed on the capacitance measuring circuit. FIG. 8 is only representative of the accumulated parasitic charge, and does not represent the accumulative wave forms of the accumulated charge.

Another method for measuring the parasitic capacitance on the capacitance measuring circuit is the parasitic switch controller causes reference electrode 20 to be driven at the same potential as the sensor electrode 30 and in a non-grounded state throughout the capacitance measuring sequence. During this parasitic measuring sequence, the parasitic switch controller causes switch 3 to remain closed and switch 4 to remain opened throughout the capacitance measuring sequence. In this arrangement, sensor electrode 30 and reference electrode 20 always have the same potential. Therefore, after capacitor 140 has been charged and discharged by the charge on sensor electrode 30 during the capacitance measuring sequence, the resulting charge should be zero if no parasitic charge in capacitance measuring circuit exists. However, if a remaining charge on capacitor 140 exists, this remaining charge represents the parasitic charge presently on capacitance measuring circuit.

Referring now to FIG. 9, a control structure is illustrated wherein the charge on the capacitor over a plurality of capacitance measuring sequences is periodically updated and adjusted by the measured parasitic charge on the circuit so as to produce an accurate capacitance reading. As shown in FIG. 9, at time $T_1$, a charge on capacitor 140 represented by $X_1$ is obtained. Corresponding charges on the capacitor at subsequent time periods $T_2$, $T_3$, $T_4$ through $T_n$ are represented by $X_2$, $X_3$, $X_4$ through $X_n$. The charge on the capacitor is then integrated to obtain an average charge for each capacitance measuring sequence. The time period which transpires during the complete execution of each capacitance measuring sequence is less than about ten seconds and is typically less than about 1 second. Therefore, ten or more capacitance measuring sequences are typically executed every ten seconds. As shown in FIG. 9, the parasitic charge Y in the capacitance control circuit is measured every ten seconds so as to adjust the integrated charge X. The time period to measure the parasitic charge is typically less than one second. A clock is used to activate the switch controller and parasitic switch controller. After every ten second period, the clock causes the parasitic switch controller to measure parasitic charge Y. This parasitic charge is then subtracted from the integrated charge obtained during the multiple capacitance measuring sequences and the resulting adjusted charge is directed to a controller which controls the lateral position of the conductive material. As can be appreciated, a microprocessor can be used to control the activation of the switch controller and parasitic controller. Alternatively, the microprocessor can function as both the switch controller and the parasitic controller.

The invention has been described with reference to a preferred embodiment and alternates thereof It is believed that many modifications and alterations to the embodiments disclosed will readily suggest itself to the those skilled in the art upon reading and understanding the detailed description of the invention. It is intended to include all such modifications and alterations insofar as they come within the scope of the present invention.

I claim:

1. A capacitance measuring circuit comprising:

a) a sensor electrode and a reference electrode, said sensor electrode and said reference electrode being spaced apart so that at least one edge of a material can be at least partially positioned between said sensor electrode and said reference electrode;

b) a first polarity and a second polarity voltage source; and c) a switch controller to electrically ground said reference electrode and to electrically connect said sensor electrode to a capacitor after said first polarity voltage source has been applied to said sensor electrode, and to electrically connect together said capacitor and said sensor electrode after said second polarity voltage source has been applied to said reference electrode and said sensor electrode.

2. The capacitance measuring circuit as defined in claim 1, wherein the voltage magnitude of said first and second polarity voltage source is generally equal.

3. The capacitance measuring circuit as defined in claim 2, wherein said first polarity voltage source is a positive voltage source and said second polarity voltage source is a negative voltage source.

4. The capacitance measuring circuit as defined in claim 1, wherein said capacitor is part of an integrator circuit.

5. The capacitance measuring circuit as defined in claim 2, wherein said capacitor is part of an integrator circuit.

6. The capacitance measuring circuit as defined in claim 4, wherein said capacitor has a capacitance of at least about 10 times the generated capacitance between said sensor electrode and said reference electrode.

7. The capacitance measuring circuit as defined in claim 5, wherein said capacitor has a capacitance of at least about 10 times the generated capacitance between said sensor electrode and said reference electrode.

8. The capacitance measuring circuit as defined in claim 1, including a charge sensor to determine the charge stored on said capacitor, said charge sensor generating a digital signal based upon the determined charge.

9. The capacitance measuring circuit as defined in claim 7, including a charge sensor to determine the charge stored on said capacitor, said charge sensor generating a digital signal based upon the determined charge.

10. The capacitance measuring circuit as defined in claim 1, wherein said switch controller causes the charge on said capacitor to discharge after a single polarity potential and a single second polarity potential has been applied to said capacitor from said sensor electrode.

11. The capacitance measuring circuit as defined in claim 2, wherein said switch controller causes the charge on said capacitor to discharge after a single polarity potential and a single second polarity potential has been applied to said capacitor from said sensor electrode.

12. The capacitance measuring circuit as defined in claim 1, wherein said switch controller causes discharges the charge on said capacitor to discharge after a plurality of first polarity potentials and a plurality of second polarity potentials have been applied to said capacitor from said sensor electrode.

13. The capacitance measuring circuit as defined in claim 2, wherein said switch controller causes discharges the charge on said capacitor to discharge after a plurality of first polarity potentials and a plurality of second polarity potentials have been applied to said capacitor from said sensor electrode.

14. The capacitance measuring circuit as defined in claim 5, wherein said switch controller causes discharges the charge on said capacitor to discharge after a plurality of first polarity potentials and a plurality of second polarity potentials have been applied to said capacitor from said sensor electrode.

15. The capacitance measuring circuit as defined in claim 1, including a position mechanism to position said material relative to said sensor electrode and said reference electrode based upon the charge on said capacitor.

16. The capacitance measuring circuit as defined in claim 2, including a position mechanism to position said material relative to said sensor electrode and said reference electrode based upon the charge on said capacitor.

17. The capacitance measuring circuit as defined in claim 4, including a position mechanism to position said material relative to said sensor electrode and said reference electrode based upon the charge on said capacitor.

18. The capacitance measuring circuit as defined in claim 5, including a position mechanism to position said material relative to said sensor electrode and said reference electrode based upon the charge on said capacitor.

19. The capacitance measuring circuit as defined in claim 9, including a position mechanism to position said material relative to said sensor electrode and said reference electrode based upon the charge on said capacitor.

20. The capacitance measuring circuit as defined in claim 2, wherein said switch controller causes discharges the charge on said capacitor to discharge after a plurality of first polarity potentials and a plurality of second polarity potentials have been applied to said capacitor from said sensor electrode.

21. The capacitance measuring circuit as defined in claim 4, wherein said switch controller causes discharges the charge on said capacitor to discharge after a plurality of first polarity potentials and a plurality of second polarity potentials have been applied to said capacitor from said sensor electrode.

22. The capacitance measuring circuit as defined in claim 5, wherein said switch controller causes discharges the charge on said capacitor to discharge after a plurality of first polarity potentials and a plurality of second polarity potentials have been applied to said capacitor from said sensor electrode.

23. The capacitance measuring circuit as defined in claim 14, wherein said switch controller causes discharges the charge on said capacitor to discharge after a plurality of first polarity potentials and a plurality of second polarity potentials have been applied to said capacitor from said sensor electrode.

24. The capacitance measuring circuit as defined in claim 1, including a shielding circuit for said sensor electrode.

25. The capacitance measuring circuit as defined in claim 23, including a shielding circuit for said sensor electrode.

26. The capacitance measuring circuit as defined in claim 1, including a shielding circuit for said reference electrode.

27. The capacitance measuring circuit as defined in claim 25, including a shielding circuit for said reference electrode.

28. The capacitance measuring circuit as defined in claim 1, including a system parasitic controller to measure system parasitic charge on at least one component of said capacitance measuring circuit.

29. The capacitance measuring circuit as defined in claim 2, including a system parasitic controller to measure system parasitic charge on at least one component of said capacitance measuring circuit.

30. The capacitance measuring circuit as defined in claim 4, including a system parasitic controller to measure system parasitic charge on at least one component of said capacitance measuring circuit.

31. The capacitance measuring circuit as defined in claim 5, including a system parasitic controller to measure system parasitic charge on at least one component of said capacitance measuring circuit.

32. The capacitance measuring circuit as defined in claim 23, including a system parasitic controller to measure system parasitic charge on at least one component of said capacitance measuring circuit.

33. The capacitance measuring circuit as defined in claim 27, including a system parasitic controller to measure system parasitic charge on at least one component of said capacitance measuring circuit.

34. The capacitance measuring circuit as defined in claim 28, including a capacitance adjustment circuit to subtract the measured system parasitic charge from the charge measured on said capacitor after said capacitor has been charged and at least partially discharged by said sensor electrode.

35. The capacitance measuring circuit as defined in claim 29, including a capacitance adjustment circuit to subtract the measured system parasitic charge from the charge measured on said capacitor after said capacitor has been charged and at least partially discharged by said sensor electrode.

36. The capacitance measuring circuit as defined in claim 30, including a capacitance adjustment circuit to subtract the measured system parasitic charge from the charge measured on said capacitor after said capacitor has been charged and at least partially discharged by said sensor electrode.

37. The capacitance measuring circuit as defined in claim 31, including a capacitance adjustment circuit to subtract the measured system parasitic charge from the charge measured on said capacitor after said capacitor has been charged and at least partially discharged by said sensor electrode.

38. The capacitance measuring circuit as defined in claim 32, including a capacitance adjustment circuit to subtract the measured system parasitic charge from the charge measured on said capacitor after said capacitor has been charged and at least partially discharged by said sensor electrode.

39. The capacitance measuring circuit as defined in claim 33, including a capacitance adjustment circuit to subtract the measured system parasitic charge from the charge measured on said capacitor after said capacitor has been charged and at least partially discharged by said sensor electrode.

40. The capacitance measuring circuit as defined in claim 28, wherein said system parasitic controller causes said reference electrode to be grounded when said first and second polarity voltage source are applied to said sensor electrode.

41. The capacitance measuring circuit as defined in claim 39, wherein said system parasitic controller causes said reference electrode to be grounded when said first and second polarity voltage source are applied to said sensor electrode.

42. The capacitance measuring circuit as defined in claim 28, wherein said system parasitic controller causes the charge on said reference electrode follows the charge on said sensor electrode when said first and said second polarity voltage source are applied to said sensor electrode.

43. The capacitance measuring circuit as defined in claim 39, wherein said system parasitic controller causes the charge on said reference electrode follows the charge on said sensor electrode when said first and said second polarity voltage source are applied to said sensor electrode.

44. The capacitance measuring circuit as defined in claim 1, including a buffer circuit position between said sensor electrode and said reference electrode.

45. The capacitance measuring circuit as defined in claim 39, including a buffer circuit position between said sensor electrode and said reference electrode.

46. A method of measuring the capacitance of a circuit comprising the steps of:
 a) providing a material;
 b) providing a sensor electrode and a reference electrode spaced apart from one another;
 c) positioning at least one edge of said material at least partially between said sensor electrode and said reference electrode;
 d) providing a capacitor to represent the capacitance between said sensor electrode and said reference electrode;
 e) charging said capacitor by connecting said sensor electrode to said capacitor after a reference voltage has been applied to said sensor electrode while said reference electrode is grounded; and
 f) at least partially discharging said capacitor by connecting said sensor electrode to said capacitor after an opposite polarity reference voltage has been applied to said sensor electrode when said sensor electrode and said reference electrode have substantially the same potential.

47. The method as defined in claim 46, including the steps of:
 a) electrically disconnecting said capacitor from said sensor electrode while said reference voltage is applied to said sensor electrode;
 b) electrically disconnecting said sensor electrode from said reference voltage after said sensor electrode has been substantially charged by said reference voltage; and
 c) electrically connecting said sensor electrode to said capacitor to charge said capacitor.

48. The method as defined in claim 46, including the steps of:
 a) electrically disconnecting said sensor electrode from said capacitor after the charge on said sensor electrode from said reference voltage has been substantially discharged;
 b) connecting said reference electrode to said sensor electrode to enable the charge on said reference electrode to follow the charge on said sensor electrode;
 c) applying said opposite polarity reference voltage to said sensor electrode;
 d) electrically disconnecting said opposite polarity reference voltage from said sensor electrode after said sensor electrode has been substantially charged by said opposite polarity reference voltage; and
 e) electrically connecting said sensor electrode to said capacitor to at least partially discharge said capacitor.

49. The method as defined in claim 47, including the steps of:
 a) electrically disconnecting said sensor electrode from said capacitor after the charge on said sensor electrode from said reference voltage has been substantially discharged;
 b) connecting said reference electrode to said sensor electrode to enable the charge on said reference electrode to follow the charge on said sensor electrode;
 c) applying said opposite polarity reference voltage to said sensor electrode;
 d) electrically disconnecting said opposite polarity reference voltage from said sensor electrode after said sensor electrode has been substantially charged by said opposite polarity reference voltage; and
 e) electrically connecting said sensor electrode to said capacitor to at least partially discharge said capacitor.

50. The method as defined in claim 46, wherein said reference voltage and said opposite polarity reference voltage having generally the same magnitude.

51. The method as defined in claim 49, wherein said reference voltage and said opposite polarity reference voltage having generally the same magnitude.

52. The method as defined in claim 46, including the step of grounding said reference electrode prior to applying said reference voltage to said sensor electrode.

53. The method as defined in claim 47, including the step of grounding said reference electrode prior to applying said reference voltage to said sensor electrode.

54. The method as defined in claim 49, including the step of grounding said reference electrode prior to applying said reference voltage to said sensor electrode.

55. The method as defined in claim 51, including the step of grounding said reference electrode prior to applying said reference voltage to said sensor electrode.

56. The method as defined in claim 46, wherein said capacitor charging step and said capacitor discharging step are repeated a plurality of times to increase the charge of said capacitor prior to the charge on said capacitor being discharged.

57. The method as defined in claim 53, wherein said capacitor charging step and said capacitor discharging step are repeated a plurality of times to increase the charge of said capacitor prior to the charge on said capacitor being discharged.

58. The method as defined in claim 46, including the step of at least partially shielding said sensor electrode.

59. The method as defined in claim 57, including the step of at least partially shielding said sensor electrode.

60. The method as defined in claim 46, including the step of at least partially shielding said reference electrode.

61. The method as defined in claim 59, including the step of at least partially shielding said reference electrode.

62. The method as defined in claim 46, including the step of measuring the charge on said capacitor to determine the capacitance between said sensor electrode and said reference electrode.

63. The method as defined in claim 47, including the step of measuring the charge on said capacitor to determine the capacitance between said sensor electrode and said reference electrode.

64. The method as defined in claim 49, including the step of measuring the charge on said capacitor to determine the capacitance between said sensor electrode and said reference electrode.

65. The method as defined in claim 61, including the step of measuring the charge on said capacitor to determine the capacitance between said sensor electrode and said reference electrode.

66. The method as defined in claim 62, wherein said measurement of the charge on said capacitor is converted to a digital signal.

67. The method as defined in claim 65, wherein said measurement of the charge on said capacitor is converted to a digital signal.

68. The method as defined in claim 62, including the step of controlling the position of said web relative to said sensor electrode and said reference electrode by said measured charge.

69. The method as defined in claim 63, including the step of controlling the position of said web relative to said sensor electrode and said reference electrode by said measured charge.

70. The method as defined in claim 64, including the step of controlling the position of said web relative to said sensor electrode and said reference electrode by said measured charge.

71. The method as defined in claim 67, including the step of controlling the position of said web relative to said sensor electrode and said reference electrode by said measured charge.

72. The method as defined in claim 62, including the step of integrating the measured charge to determine the capacitance between said reference electrode and said sensor electrode and said material.

73. The method as defined in claim 71, including the step of integrating the measured charge to determine the capacitance between said reference electrode and said sensor electrode and said material.

74. The method as defined in claim 46, wherein said capacitance rating of said capacitor selected to have a capacitance of at least about 10 times the measured capacitance between said sensor electrode and said reference electrode.

75. The method as defined in claim 56, wherein said capacitance rating of said capacitor selected to have a capacitance of at least about 10 times the measured capacitance between said sensor electrode and said reference electrode.

76. The method as defined in claim 73, wherein said capacitance rating of said capacitor selected to have a capacitance of at least about 10 times the measured capacitance between said sensor electrode and said reference electrode.

77. The method as defined in claim 46, including the step of measuring of a parasitic charge.

78. The method as defined in claim 47, including the step of measuring of a parasitic charge.

79. The method as defined in claim 49, including the step of measuring of a parasitic charge.

80. The method as defined in claim 76, including the step of measuring of a parasitic charge.

81. The method as defined in claim 62, including the step of measuring of a parasitic charge.

82. The method as defined in claim 81, wherein said measured parasitic charge is subtracted from said measuring the charge on said capacitor.

83. The method as defined in claim 80, wherein said measured parasitic charge is subtracted from said measuring the charge on said capacitor.

84. The method as defined in claim 77, wherein the measuring of a parasitic charge includes the steps of:
  a) charging said capacitor by connecting said sensor electrode to said capacitor after a reference voltage has been applied to said sensor electrode and the potential on said reference electrode has at least substantially followed the potential on said sensor electrode; and
  b) at least partially discharging said capacitor by connecting said sensor electrode to said capacitor after an opposite polarity reference voltage has been applied to said sensor electrode and the potential on said reference electrode has at least substantially followed the potential on said sensor electrode.

85. The method as defined in claim 83, wherein the measuring of a parasitic charge includes the steps of:
  a) charging said capacitor by connecting said sensor electrode to said capacitor after a reference voltage has been applied to said sensor electrode and the potential on said reference electrode has at least substantially followed the potential on said sensor electrode; and
  b) at least partially discharging said capacitor by connecting said sensor electrode and said reference electrode to said capacitor after an opposite polarity reference voltage has been applied to said sensor electrode and the potential on said reference electrode has at least substantially followed the potential on said sensor electrode.

86. The method as defined in claim 77, wherein the measuring of a parasitic charge includes the steps of:

a) charging said capacitor by connecting said sensor electrode to said capacitor after a reference voltage has been applied to said sensor electrode while said reference electrode is grounded; and b) at least partially discharging said capacitor by connecting said sensor electrode to said capacitor after an opposite polarity reference voltage has been applied to said sensor electrode while said reference electrode reference electrode is grounded.

87. The method as defined in claim 83, wherein the measuring of a parasitic charge includes the steps of:

a) charging said capacitor by connecting said sensor electrode to said capacitor after a reference voltage has been applied to said sensor electrode while said reference electrode is grounded; and b) at least partially discharging said capacitor by connecting said sensor electrode to said capacitor after an opposite polarity reference voltage has been applied to said sensor electrode while said reference electrode reference electrode is grounded.

* * * * *